United States Patent
Hansen et al.

(10) Patent No.: US 7,912,449 B2
(45) Date of Patent: Mar. 22, 2011

(54) METHOD AND SYSTEM FOR 60 GHZ LOCATION DETERMINATION AND COORDINATION OF WLAN/WPAN/GPS MULTIMODE DEVICES

(75) Inventors: Christopher J. Hansen, Sunnyvale, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 633 days.

(21) Appl. No.: 11/924,814

(22) Filed: Oct. 26, 2007

(65) Prior Publication Data
US 2008/0311851 A1   Dec. 18, 2008

Related U.S. Application Data

(60) Provisional application No. 60/944,015, filed on Jun. 14, 2007.

(51) Int. Cl.
*H04M 11/04* (2006.01)
(52) U.S. Cl. ............... 455/404.2; 455/414.2; 455/456.1; 455/457; 340/426.19; 342/417
(58) Field of Classification Search ............... 455/404.2, 455/414.2, 456.1, 457, 16, 456.6; 340/426.19, 340/539.13, 584; 342/417
See application file for complete search history.

(56) References Cited

U.S. PATENT DOCUMENTS

| | | | | |
|---|---|---|---|---|
| 5,739,786 A * | 4/1998 | Greenspan et al. | ........ | 342/357.1 |
| 5,740,164 A * | 4/1998 | Liron | ............... | 370/316 |
| 6,310,587 B1 * | 10/2001 | Villino et al. | ............ | 343/911 R |
| 6,370,371 B1 * | 4/2002 | Sorrells et al. | ................ | 455/323 |
| 7,295,119 B2 * | 11/2007 | Rappaport et al. | ......... | 340/572.4 |
| 7,561,048 B2 * | 7/2009 | Yushkov et al. | ........... | 340/572.1 |
| 7,617,342 B2 * | 11/2009 | Rofougaran | ................. | 710/100 |
| 2004/0198386 A1 * | 10/2004 | Dupray | ..................... | 455/456.1 |
| 2006/0220958 A1 * | 10/2006 | Saegrov | ................ | 343/700 MS |
| 2008/0014948 A1 * | 1/2008 | Scheinert | ..................... | 455/444 |
| 2008/0183927 A1 * | 7/2008 | Rofougaran | ................. | 710/106 |
| 2008/0310354 A1 * | 12/2008 | Hansen et al. | ................ | 370/329 |
| 2008/0311944 A1 * | 12/2008 | Hansen et al. | ................ | 455/517 |
| 2008/0318595 A1 * | 12/2008 | Rofougaran | ................... | 455/456.1 |
| 2008/0318684 A1 * | 12/2008 | Rofougaran | .................... | 463/39 |
| 2009/0002316 A1 * | 1/2009 | Rofougaran | ................... | 345/156 |
| 2009/0006675 A1 * | 1/2009 | Rofougaran | .................... | 710/62 |
| 2009/0006677 A1 * | 1/2009 | Rofougaran | .................... | 710/63 |
| 2009/0006699 A1 * | 1/2009 | Rofougaran | ................... | 710/304 |
| 2009/0011832 A1 * | 1/2009 | Rofougaran | .................... | 463/41 |
| 2009/0047979 A1 * | 2/2009 | Oh et al. | ..................... | 455/457 |
| 2009/0073442 A1 * | 3/2009 | Smith | ........................ | 356/367 |
| 2009/0167604 A1 * | 7/2009 | Roberts | ........................ | 342/368 |
| 2009/0213901 A1 * | 8/2009 | Berens | .......................... | 375/130 |
| 2009/0232229 A1 * | 9/2009 | Sandhu et al. | ................. | 375/260 |
| 2009/0258652 A1 * | 10/2009 | Lambert et al. | ............... | 455/446 |
| 2009/0295648 A1 * | 12/2009 | Dorsey et al. | ................. | 343/702 |
| 2010/0048172 A1 * | 2/2010 | Karaoguz | ..................... | 455/411 |
| 2010/0067434 A1 * | 3/2010 | Siu et al. | ..................... | 370/328 |

(Continued)

*Primary Examiner* — Minh D Dao
(74) *Attorney, Agent, or Firm* — McAndrews, Held & Malloy, Ltd.

(57) ABSTRACT

Within a local region, information may be communicated between two or more wireless multimode communication devices (WMCD) comprising 60 GHz band and lower frequency band wireless interfaces. Spatial relationships between devices may vary. The 60 GHz interface may handle location determination operations and data transfers. The lower frequency band may support WPAN, WLAN and may handle coordination of communications and data transfers. The WMCDs may be coupled with a network. Antennas may be directional. Moreover, the spatial orientation of the antennas may be dynamically modified or swept across a specified angle. Furthermore, intelligent and/or adaptive antenna systems may be utilized. The WMCDs may utilize a position and/or time reference system to aid in location determination operations.

25 Claims, 6 Drawing Sheets

U.S. PATENT DOCUMENTS

2010/0073202 A1* 3/2010 Mazed ................... 340/999
2010/0077115 A1* 3/2010 Rofougaran ............. 710/63
2010/0080197 A1* 4/2010 Kanellakis et al. ......... 370/338

* cited by examiner

METHOD AND SYSTEM FOR 60 GHZ LOCATION DETERMINATION AND COORDINATION OF WLAN/WPAN/GPS MULTIMODE DEVICES

CROSS-REFERENCE TO RELATED APPLICATIONS/INCORPORATION BY REFERENCE

This application makes reference to and claims priority to U.S. Provisional Application Ser. No. 60/944,015, which was filed on Jun. 14, 2007 and is hereby incorporated herein by reference in its entirety.

FIELD OF THE INVENTION

Certain embodiments of the invention relate to wireless communication. More specifically, certain embodiments of the invention relate to a method and system for 60 GHz location determination and coordination of WLAN/WPAN/GPS multimode devices.

BACKGROUND OF THE INVENTION

The field of wireless communication has seen dramatic growth the last few years. In today's world, most people use their mobile devices, be it cellular phones, PDA's, laptops, media players and/or other devices for business and personal use on a constant and daily basis. Often multiple users within a local environment operate on a plurality of wireless interfaces. In addition to voice and data communication such as email and internet browsing, these devices may enable high speed data transfer such as video streaming or multi-user gaming wherein multiple users interact with one or more video display applications. Wireless services provide links to cellular technologies or WIMAX for wide area communications while links within a local region may comprise technologies such as wireless local area networks (WLAN) and wireless personal area networks (WPAN).

WLAN and WPAN enable a broad array of applications by providing flexibility and convenience in the connectivity they provide. These systems generally replace cumbersome cabling and/or wiring used to connect peripheral devices and/or mobile terminals by providing short distance wireless links that allow connectivity within typically, a 10-meter range for WPAN and a 100m range for WLAN.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for 60 GHz location determination and coordination of WLAN/WPAN/GPS multimode devices, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for 60 GHz location determination and coordination of WLAN/WPAN/GPS wireless multimode communication devices (WMCDs). In this regard, 60 GHz transmissions may utilize any available unlicensed millimeter wave frequency band within the range of 57 to 66 GHz. Aspects of the invention may comprise communication between the WMCDs on one or more frequencies. Wireless modes of communication may comprise wireless local area network (WLAN) that may be compliant with 802.11 standards, wireless personal area network (WPAN), for example Bluetooth networks, ultra wide-band (UWB) such as Wimedia, Global Positioning System (GPS), WIMAX and/or any suitable cellular or wireless technology. However, the invention is not limited with regard to any specific wireless technology or alternate frequency. A plurality of frequency bands may be utilized for communication between the WMCDs. Higher frequencies, near 60 GHz, may enable location determination operations and high speed data transfer between the WMCDs. The 60 GHz wireless links may be highly directional and may transfer signals point to point between the WMCDs. Lower frequencies, for example 2.4 GHz and/or 5 GHz, often used for WPAN and/or WLAN, may be utilized to communicate between WMCDs with regard to sharing data and/or system management related tasks. These lower frequencies may be radiated via a broader angle antenna and/or over greater distances than the 60 GHz transmissions. In some embodiments of the invention, the WMCDs may be enabled to support multiple connections simultaneously or in a multiplex pattern.

Figure 1A:
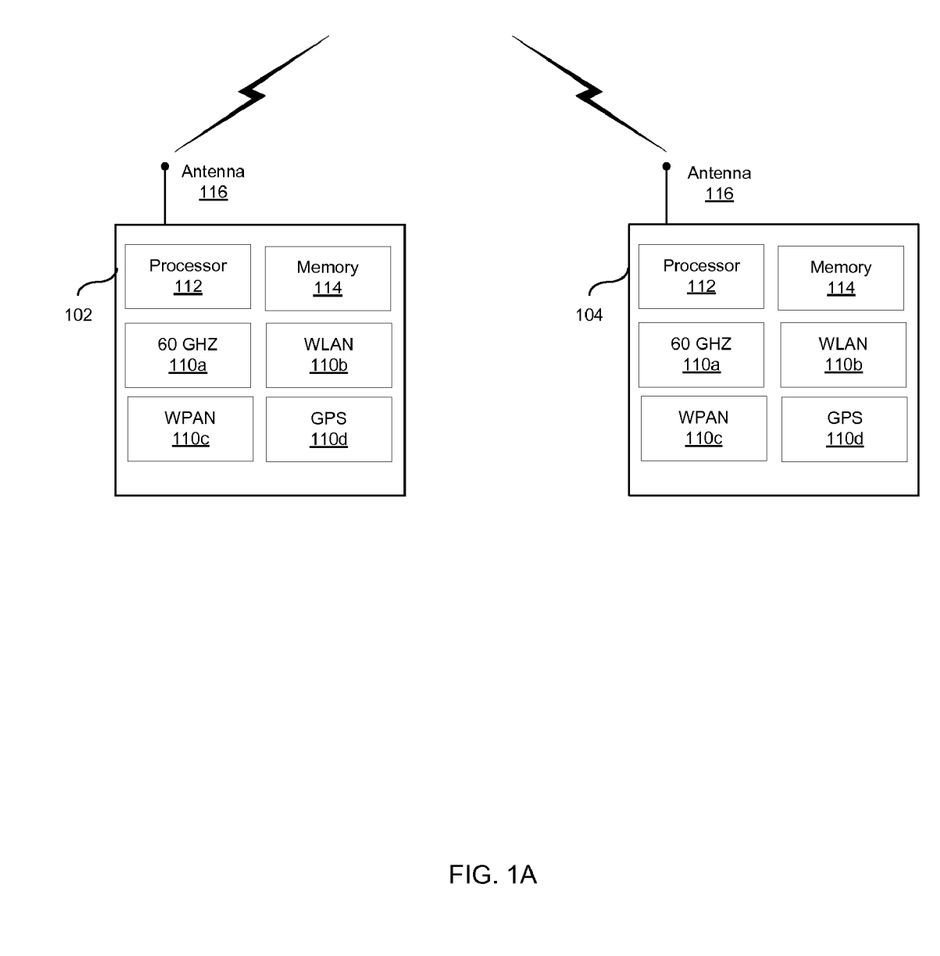
FIG. 1A is a block diagram that illustrates exemplary wireless multimode communication devices (WMCDs), in accordance with an embodiment of the invention.

FIG. 1A is a block diagram that illustrates exemplary wireless multimode communication devices (WMCDs), in accordance with an embodiment of the invention. Referring to FIG. 1A, there is shown two WMCDs 102 and 104. The two WMCDs 102 and 104 each comprise at least a processor block 112, a memory block 114 and a 60 GHz block 110*a*. In addition, the WMCDs 102 and 104 may comprise one or more of a wireless local area network (WLAN) block 110*b*, a wireless personal area network (WPAN) block 110*c*, a Bluetooth block and/or a global positioning system (GPS) receiver 110*d*. The WMCDs 102 and 104 are not limited to these specific wireless technology interfaces and may comprise any suitable wireless interface, for example, any type of cellular and/or WIMAX technologies may be utilized.

Exemplary location tasks may comprise tasks that determine a location for one or more devices by, for example, measuring the relative angle of a device from a reference direction and/or measuring a relative distance from one device to another. Relative angle and distance information may be utilized to determine a direction or bearing for signal radiation and/or reception wherein WMCDs may communicate via highly directional and/or adaptive antennas. Furthermore, relative positions may be mapped to a reference frame such as one utilizing self determined reference directions or one indicating North, South, East, West and altitude for example. In this regard, coordinates may be determined via triangulation calculations for example.

The WMCDs 102 and/or 104 may comprise suitable logic, circuitry and/or code that enable wireless communication via one or more wireless interfaces. For example, the WMCDs 102 and/or 104 may utilize the highly directional 60 GHz link 110*a* to enable location operations. In addition, one or more of the WMCDs 102 and/or 104 may be capable of receiving GPS information for location assistance.

The WMCDs 102 and/or 104 may not be limited with regard to any specific software application. For example, the WMCDs 102 and/or 104 may be utilized as high speed video gaming devices used within an interior and/or exterior space. In another embodiment of the invention, the WMCDs 102 and/or 104 may support multimedia file transfers and/or multimedia rendering functionality. Moreover, the WMCDs 102 and/or 104 may support a plurality of applications and wireless interfaces. For example, the WMCDs 102 and/or 104 may enable internet access for browsing, gaming, data retrieval and/or voice over internet protocol (VOIP). The WMCDs 102 and/or 104 may enable wireless phone connections for example.

Local connections communicating with lower data rates between the WMCDs 102 and 104 may enable tasks such as device discovery, connection initiation, security operations, data transfer, service coordination and/or location determination for example. In some embodiments of the invention, one of the WMCDs, for example block 102, may control and coordinate operations among a plurality of WMCDs. For example, carrier frequency or channel assignments for the WMCDs 102 and 104 may be determined by the WMCDs 102. In some embodiments of the invention, the control and coordination task may transfer from one device to another as needed. In other embodiments of the invention, the WMCDs 102 and 104 may have a peer to peer relationship. Moreover, one or more of the WMCDs 102 and 104 may function as a residential gateway and may connect to the internet or another network via a line and/or wireless connection. The WMCDs 102 and 104 may be communicatively coupled with each other as well as other wireless and/or line devices.

The processor block 112 may comprise suitable logic, circuitry and or code to enable a plurality of tasks for the WMCDs 102 and/or 104. For example the processor block 112 may enable location determination that may comprise spatial information processing such as determining the position and/or mapping one or more WMCDs based on radio measurements such as angle of arrival or time of arrival for example. The processor block 112 may enable communication operations and processing of information, for example gaming information or digital image rendering. In addition the processor block 112 may enable coordination of communication and/or processing tasks in one or more WMCDs. The processor block 112 may comprise one or more general purpose processors and/or one or more special purpose processors. The processor block 112 may be communicatively coupled to the memory block 114, the antenna block 116, the 60 GHz block 110*a*, WLAN block 110*b*, WPAN block 110*c* and or the GPS receiver 110*d*.

The memory block 114 may comprise suitable logic, circuitry and or code to store and retrieve data for the WMCDs 102 and 144. In addition to supporting communications, gaming and/or image processing operations, the memory block 114 may support location determination operations. The memory block 114 may be communicatively coupled with the processor block 112, the antenna block 116, the 60 GHz block 110*a*, WLAN block 110*b*, WPAN block 110*c* and or the GPS receiver 110*d*.

The antenna block 116 may comprise suitable logic, circuitry and or code to enable transmission and/or reception of signals between the WMCDs 102 and 104 as well as with other wireless devices and/or systems, for example, the global positioning system (GPS). The antenna block 116 may comprise one or more antenna elements and/or antenna arrays. For example, the antenna block 116 may comprise wide band elements and/or multiple narrower band elements for one or more frequency bands. The antenna block 116 may comprise one or more directional and/or omni-directional antennas. In addition, the antenna block 116 may enable sweeping the direction of transmission or reception through varying angles. For example, the WMCDs 102 and/or 104 may transmit a 60 MHz pilot or beacon signal via an antenna that sweeps or varies the azimuth of the antenna over 360°. The attributes of the antenna block 116 may be not be limited to this example and may vary according to the needs of a specific design. The antenna block 116 may be communicatively coupled with the 60 GHz block 110*a*, the WLAN block 110*b*, the WPAN block 110*c*, the GPS receiver 110*d* and/or any other wireless transceivers suitably utilized. In addition, the antenna block 116 may be communicatively coupled with the processor block 112 and the memory block 114.

The 60 GHz physical interface 110*a* may comprise suitable logic, circuitry and/or code to enable communications within a local region relative to WMCDs 102 and/or 104. For example, local file transfers, video connections and/or high speed video single or multi-user gaming may be supported. The 60 GHz block may comprise a physical layer interface or a physical layer interface and a medium access control (MAC) layer. The 60 GHz signals may be transmitted short distances, point to point, in a highly directional radiating pattern. In addition, the 60 GHz interface 110*a* may support location determination operations for the WMCDs 102 and/or 104. In this regard, the 60 GHz physical interface may support ultra wide band (UWB) technology or other wireless technologies. In one embodiment of the invention, an initial reference position for one or more devices may be known based on GPS information or another source of location information such as user configuration data. Subsequently, a position for the WMCDs 102 and/or 104, within a local region may be determined relative to one or more known reference positions. Millimeter waves from the 60 gigahertz physical interface 110*a* may be used to augment GPS or other position information and may improve precision of position measurements. Furthermore, antenna arrays or directional antennas may be utilized with the 60 GHz interface 110*a* to support angle of arrival measurements for signals from other devices.

The wireless local area network (WLAN) block 110*b* may comprise suitable logic, circuitry and or code to enable communications within a local region relative to the WMCDs 102 and/or 104. The WLAN block 110*b* may support an IEEE 802.11 physical layer (PHY) or a PHY and a media access control (MAC) layer. In addition, the WLAN block 110*b* may operate on a lower portion of spectrum, for example, near 2.4 GHz and/or 5 GHz. The WLAN block 110*b* may be utilized to communicate and/or retrieve data from a computer or network, for example video and/or audio data. Moreover, the WLAN block 110b may be utilized to access the Internet for communication of audio/video data, web surfing and/or voice over IP for example. In some embodiments of the invention, the WLAN may be utilized to support location determination by sharing location information such as angle and/or time measurements or coordinates for a WMCD obtained via the 60 GHz block 110a and/or GPS block 110d with one or more devices.

The wireless personal area network (WPAN) block 110c may comprise suitable logic, circuitry and or code to enable communications within a local region relative to the WMCDs 102 and/or 104. The WPAN block 110c may comprise for example, a Bluetooth transceiver comprising a physical layer interface or a physical layer interface and a medium access control (MAC) layer. The WPAN block 110c may support operations in the 2.4 GHz and/or 5 GHz frequency bands or may operate in other available spectrum. The WPAN block 110c is not limited with regard to wireless technologies and may, for example, support frequency hopping or UWB technology capable of high speed file transfer. The WPAN block 110c may enable device discovery, security operations and/or general administrative activity among WMCDs 102 and 104. The WPAN block 110c may be communicatively coupled with the processor block 112, the memory block 114 and/or the antenna block 116.

The GPS block 110d may comprise suitable logic, circuitry and or code to enable communications with Global Positioning System (GPS) satellites. The GPS block 110d may comprise a GPS receiver enabling reception of spread spectrum signals carrying information that enables clock synchronization and/or coarse position determination for civilian applications or more precise position determination for military applications. GPS information comprising satellite position, current time and measured delay of the received signal, may be utilized to calculate a position fix for the WMCDs 102 and/or 104. Position errors caused by atmospheric conditions, multi-path signals, clock errors and other physical conditions may be processed for improved accuracy. The GPS block 110d may be communicatively coupled with the processor block 112, the memory block 114 and the antenna block 116.

In operation, the WMCDs 102 and 104 may communicate via multiple wireless interfaces comprising a 60 GHz and one or more lower frequency wireless interfaces such as WLAN 110b and/or WPAN 110c. The 60 GHz block 110a and/or the GPS block 110d may enable location determination operations. In this regard, the 60 GHz block 110a may improve the precision of location determination based on GPS information and or user configuration data. In addition, high speed data transfer, for example audio and/or video data, may be transmitted between devices via the 60 GHz physical interface 110a.

The lower frequency interfaces, for example WLAN 110b and/or WPAN 110c, may be utilized to enable application and communication operations among WMCDs such as WMCDs 102 and 104. For example, lower frequency interfaces may be utilized to transfer data with regard to security and/or coordination among devices. A WPAN interface 110c may, for example, enable discovery of devices within a local region. A WLAN interface 110b may, for example, enable sharing of location determination information among devices that was received from the 60 GHz 110a or GPS 110d interfaces. Moreover, information utilized by applications running on the WMCDs 102 and 104 may be retrieved from a network and distributed via the WLAN physical interface 110b for example.

The WMCDs 102 and/or 104 may be utilized in a plurality of applications that may comprise multi-user high speed wireless gaming and/or audio/video wireless data transfer and rendering for example. The invention is not limited with regard to specific applications and a WMCD 102 and/or 104 may support a plurality of applications.

Figure 1B:
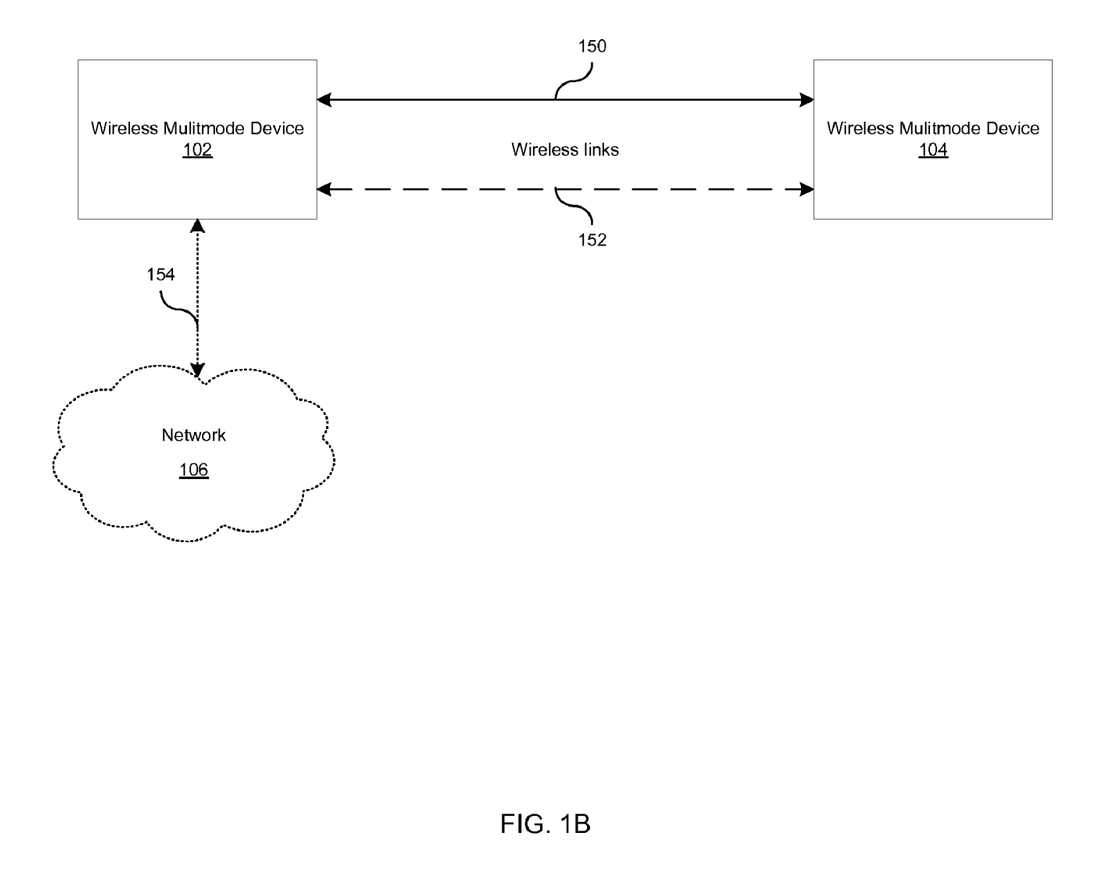
FIG. 1B is a block diagram that illustrates exemplary multi-band communications between WMCDs, in accordance with an embodiment of the invention.

FIG. 1B is a block diagram that illustrates exemplary multi-band communications between wireless multimode communication devices (WMCDs), in accordance with an embodiment of the invention. Referring to FIG. 1B, there is shown two WMCDs 102 and 104, a wireless link 150, a 60 GHz wireless link 152, an optional line or wireless communications link 154 and an optional network 106.

The WMCD 102 may be the same or similar to the device 102 described in FIG. 1A. The WMCD 102 may comprise suitable logic, circuitry and/or code to enable wireless communication via one or more wireless interfaces as well as enable location determination of one or more WMCDs via a 60 GHz interface. In addition, the WMCD 102 may be capable of receiving GPS information for location determination assistance. In one embodiment of the invention, the WMCD 102 may be connected to a line and/or wireless network 106 that may be, for example, the internet. Accordingly, WMCD 102 may act as a base station, an access point and/or a gateway to a network for one or more local devices such as WMCD 104. In addition, the WMCD 102 may serve as a coordinator and/or controller of operations in relation to one or more devices such as WMCD 104 and may change roles with another device such as WMCD 104, wherein the other device becomes the coordinator and/or controller of operations. Moreover, the WMCD 102 may handle peer to peer relationships with one or more devices such as WMCD 104. The WMCDs may be a stationary unit or may be portable or mobile. In this regard, the WMCD 104 may be, for example, a WLAN access point, a video server or video recorder/player device.

The WMCD 102 may enable location determination for one or more devices such as WMCD 104. In this regard, the WMCD 102 may transmit a 60 GHz pilot or beacon signal to enable location determination for one or more devices such as WMCD 104. The WMCD 102 may utilize wireless technologies on lower operating frequencies, for example, utilizing WLAN or WPAN to share location determination information with one or more devices such as WMCD 104.

The WMCD 104 may be the same or similar to the WMCD 104 described in FIG. 1A. The WMCD 104 may comprise suitable logic, circuitry and/or code to enable wireless communication via one or more wireless interfaces as well as enable location determination for one or more WMCDs via a 60 GHz interface. In addition, the WMCD 104 may be capable of receiving and processing GPS information for location determination assistance. In one embodiment of the invention, the WMCD 104 may receive coordination and/or control information from the WMCD 102. In some embodiments of the invention, the WMCD 104 may be enabled to change roles with WMCD 102 wherein WMCD 104 may become the coordinator and/or controller of operations among a plurality of WMCDs. Moreover, the WMCD 104 may handle peer to peer relationships with one or more devices such as WMCDs 102 and/or 104.

The WMCD 104 may enable location determination for one or more WMCD 102 and/or 104. In this regard, the WMCD 104 may receive and/or may transmit a 60 GHz pilot or beacon signal to enable location determination of one or more WMCDs. The WMCD 104 may utilize wireless technologies on lower operating frequencies for example WLAN or WPAN to share information for example information regarding discover, location determination, security operations, application data, control and/or coordination information with one or more WMCDs.

The wireless link 150 may communicatively couple two or more WMCDs such as WMCDs 102 and 104. Accordingly, the WMCDs 102 and 104 may comprise suitable logic, circuitry and/or code to generate the wireless link 150. Accordingly, the wireless link 150 may be enabled to share data, perform discovery, initiate connections and/or facilitate operations for example. The wireless link 150 may support lower frequencies than the 60 GHz link 152, for example 2.4 GHz and/or 5 GHz often used for WPAN and WLAN. However, the invention is not limited with regard to specific carrier frequencies and any suitable frequency may be utilized. These lower frequencies may be transmitted in a broad-angle radiating pattern or even in an omni directional pattern. Achievable transmission distance or range, supported by the wireless link 150, may vary depending on a plurality of factors comprising carrier frequency, wireless technology, radiating power as well as physical environment (for example, an interior space versus an exterior space). Ranges may vary from approximately 10 m to over 100 m. In some embodiments of the invention, ultra-wideband (UWB) technology may be utilized for short range communications among the WMCDs 102 and 104. Accordingly, UWB links may support high speed data transfers. Moreover, worldwide interoperability for microwave access (WIMAX) or various other cellular connections may be utilized and may enable longer range communications.

The 60 GHz wireless link 152 may communicatively couple two or more WMCDs such as WMCDs 102 and 104. Accordingly, the WMCDs 102 and 104 may comprise suitable logic, circuitry and/or code to generate the 60 GHz wireless link 152. The 60 GHz wireless link 152 may be enabled to support location determination operations, video streaming, high speed video for multi-user gaming connections and/or high speed data transfers on the WMCDs 102 and/or 104. Accordingly, the 60 GHz wireless links may be radiated in highly directional patterns over short ranges. In some embodiments of the invention, adaptive antenna arrays or other intelligent antenna technologies may be utilized. Highly directional 60 GHz transmissions may comprise point to point communication between devices. In this regard, a participating device may have or gain knowledge of the relative positions or absolute locations of one more other devices participating in the communication. In another embodiment of the invention, the 60 GHz wireless link 152 may support location determination operations. In this regard, the 60 GHz wireless link may for example be utilized to transmit and receive a pilot or beacon signal. The pilot or beacon signal may radiate in a stationary pattern or, the direction of radiation may be varied, for example, may be swept over an angle.

The network 106 may be a private, public or ad hoc network for example that may support applications running on the WMCDs 102 and/or 104. The network 106 may comprise suitable logic, circuitry and or code to handle data that may be utilized by one or more of the WMCDs 102 and 104. For example, audio and/or video (A/V) data may be transferred to one or more WMCDs 102 and 104 from the network 106 and may be rendered. The network 106 may be communicatively coupled with the WMCD 102 via the communications link 154. The communications link 154 may comprise suitable logic, circuitry and/or code that may enable the transfer of data between the WMCD 102 and the network 106. Accordingly, any suitable communications network technology and communications protocol may be utilized.

In operation, the WMCDs 102 and 104 may communicate via a plurality of wireless interfaces. In this regard, high bandwidth, highly directional, short range tasks such as location determination and high speed single or multi-user gaming data transfers may be enabled via the 60 GHz wireless link 152. Moreover tasks supporting the 60 GHz wireless link 152, for example, sharing location determination and other administrative tasks such as device discovery, connection initiation and security operations may be enabled by the lower frequency wireless link 150.

Upon receiving a request for service, the WMCD 102 may utilize a lower frequency wireless link 150 to enable discovery of devices within a local region. In addition, a lower frequency wireless link 150 may enable connection and security communications for the WMCDs 102 and/or 104 via WPAN 110c and/or WLAN 110d wireless interfaces for example. Moreover, software and/or information regarding one or more applications running on the WMCDs 102 and/or 104 may be received by the WMCD 102 from the network 106 via the communications link 154 and may be distributed via the lower frequency wireless link 150 to the WMCD 104 for example. The 60 GHz link may be utilized to enable location determination with an improved level of precision and may enable high speed communications between the WMCDs 102 and 104.

Figure 1C:
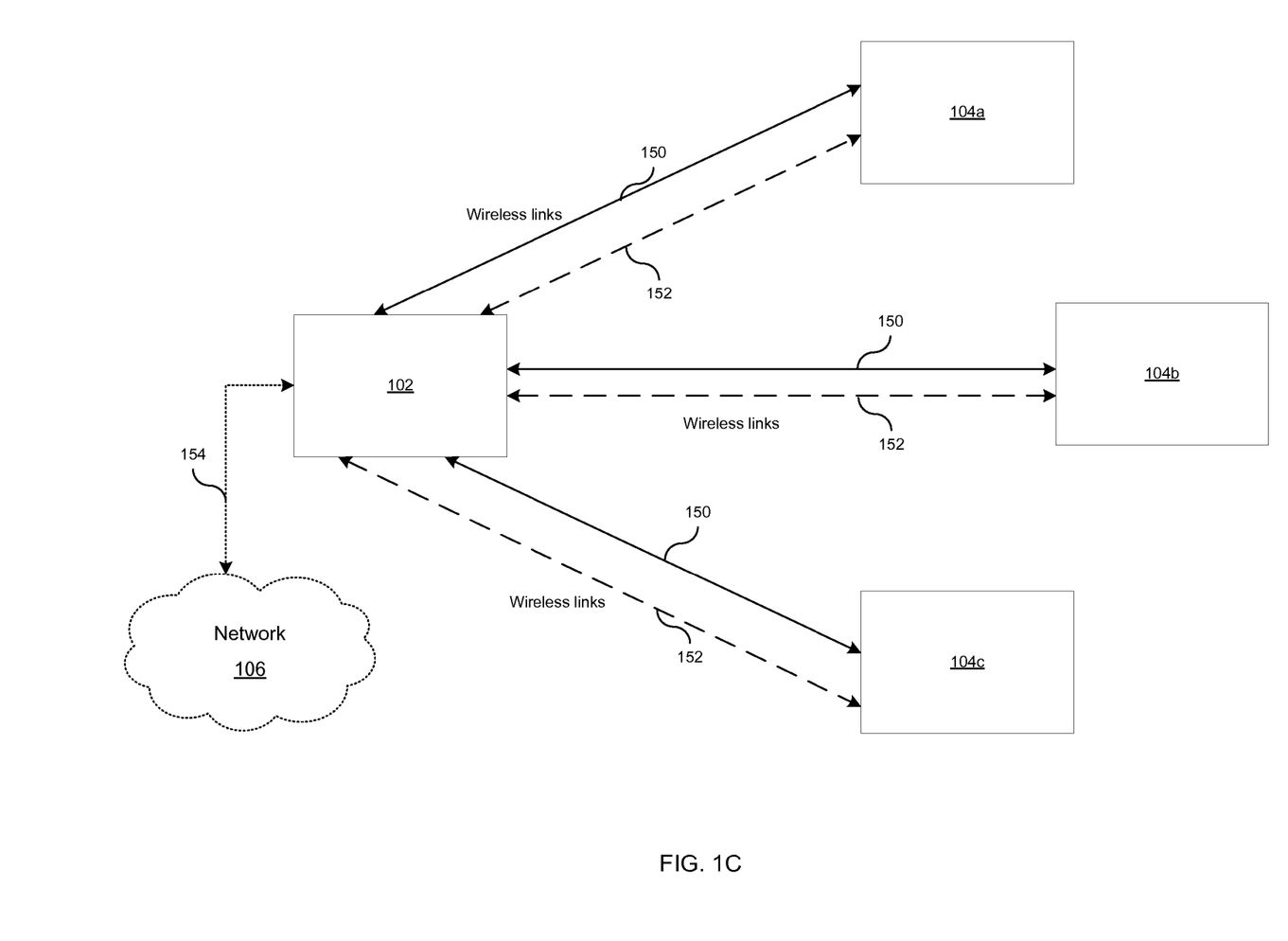
FIG. 1C is a block diagram that illustrates an exemplary system comprising a control and coordination WMCD communicating with one or more WMCDs, in accordance with an embodiment of the invention.

FIG. 1C is a block diagram that illustrates an exemplary system comprising a control and coordination WMCD communicating with one or more WMCDs, in accordance with an embodiment of the invention. Referring to FIG. 1C, there is shown four WMCDs 102, 104a, 104b and 104c, a plurality of wireless links 150, a plurality of 60 GHz wireless links 152, an optional line or wireless communications link 154 and an optional network 106.

The optional network 106 and wireless or line communications link 154 may be similar or substantially the same as the network 106 and wireless or line communications link 154 described in FIG. 1B. The WMCD 102 may be similar and or substantially the same as the WMCD 102 described in FIGS. 1A and 1B. Moreover, the WMCDs 104a, 104b and 104c may each be similar and or substantially the same as the WMCD 104 described in FIGS. 1A and 1B. Furthermore, the 60 GHz wireless link 152 and lower frequency wireless link 150 may be similar and/or substantially the same as the 60 GHz wireless link 152 and lower frequency wireless link 150 shown in FIG. B.

In operation, the WMCD 102 may for example function as control and coordination device for a plurality of WMCDs 104a, 104b and/or 104c. The WMCD 102 may communicate with network resources via the network 106 and communications link 154. In some embodiments of the invention, the WMCD 102 may, for example, comprise a video display and a gaming console. Accordingly, one or more of the WMCDs 104a, 104b and/or 104c may be, for example, handheld audio/video devices comprising gaming capability and that may participate in high speed video, multi-user gaming applications with the WMCD 102 via the wireless links 150 and 60 GHz links 152. The WMCD 102 may coordinate location determination operations for the one or more WMCDs 104a, 104b and/or 104c. In this regard the WMCD may calculate and/or may map participating device positions based on location data received from the GPS system and/or the one or more WMCDs 104a, 104b and/or 104c and may share location information with the one or more participating devices 104a, 104b and/or 104c via the wireless links 150.

In some embodiments of the invention, the WMCD 102 may manage frequency and/or communication interface assignments for the WMCDs 104a, 104b and/or 104c based on location information. Accordingly, the WMCD 102 may manage signal interference among the WMCDs that are active in the local region. In some embodiments of the invention, one or more of the WMCDs 104a, 104b and 104c may not participate in the gaming activity however, may be actively transmitting and receiving wireless signals for a different application within the local region of the gaming participants and may benefit from frequency and/or wireless interface management coordination from the WMCD 102. The invention is not limited with regard to any specific application and may enable any suitable application.

Figure 1D:
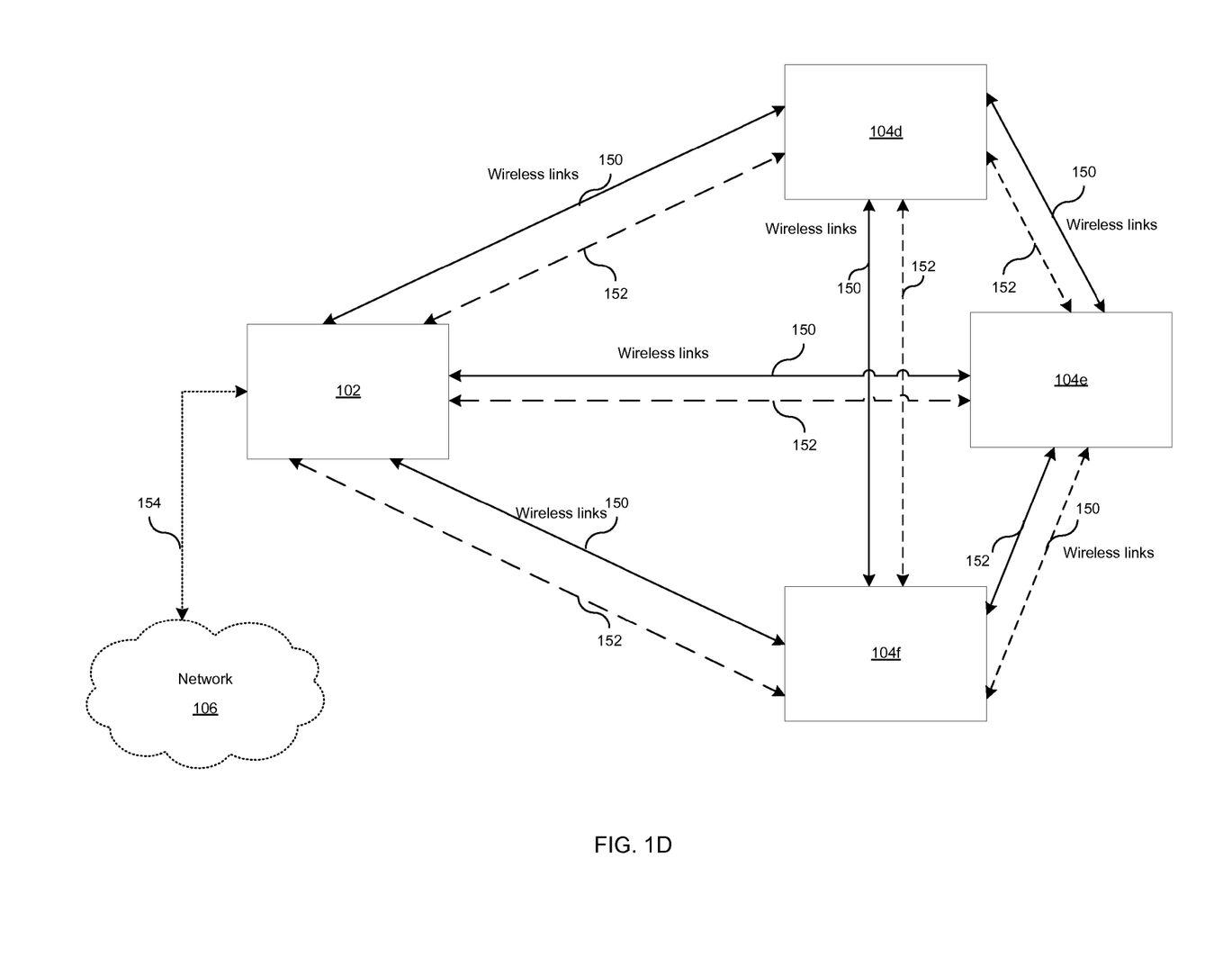
FIG. 1D is a block diagram that illustrates an exemplary system comprising a control and coordination device communicating with one or more WMCDs that may also communicate with each other, in accordance with an embodiment of the invention.

FIG. 1D is a block diagram that illustrates an exemplary system comprising a control and coordination device communicating with one or more WMCDs that may also communicate with each other, in accordance with an embodiment of the invention. Referring to FIG. 1D, there are shown four WMCDs 102, 104d, 104e and 104f, a plurality of wireless links 150, a plurality of 60 GHz wireless links 152, an optional line or wireless communications link 154 and an optional network 106.

The optional network 106 and wireless or line communications link 154 may be similar or substantially the same as the network 106 and wireless or line communications link 154 described in FIG. 1B. The WMCD 102 may be similar and or substantially the same as the WMCD 102 described in FIGS. 1A and 1B. Moreover, the WMCDs 104d, 104e and 104f may each be similar and or substantially the same as the WMCD 104 described in FIGS. 1A and 1B. The 60 GHz wireless link 152 and lower frequency wireless link 150 may be similar and/or substantially the same as the 60 GHz wireless link 152 and lower frequency wireless link 150 shown in FIG. B.

In operation, the exemplary system shown in FIG. 1D may be similar to the system described in FIG. 1C, for example. However, the wireless multimedia devices 104d, 104e and 104f shown in FIG. 1D may utilize the 60 GHz wireless links 152 and/or lower frequency wireless links 150 to communicate with each other as well as the WMCD 102. In this regard, the WMCD 102 may function as a control and coordination device for one or more of the WMCDs 104d, 104e and/or 104f. However, in various embodiments of the invention, the WMCD 102 may have fewer control and coordination tasks such that some of those tasks are handled by the WMCDs 104d, 104e and/or 104f. For example, administrative tasks such as connection initialization, security operations, sharing location determination information or frequency/wireless interface information may be enabled via the lower frequency wireless links 150. In addition high level application processes such as data transfer may be handled via the lower frequency wireless links 150. For example an ultra wide band (UWB) link may enable high data rate transmissions comprising video content over short distances.

The 60 GHz links 152 also may be utilized to transfer high speed data among the WMCDs 102, 104d, 104e and/or 104f. Moreover, the 60 GHz links 152 may be utilized to enable location determination operations among the WMCDs 102, 104d, 104e and/or 104f. In this regard, the WMCDs may comprise adaptive antennas or highly directional antennas on the 60 GHz wireless links 152 enabling angle of arrival measurements. Furthermore, GPS receivers within the WMCDs 102, 104d, 104e and/or 104f may aid location determination operations by providing a precise timing reference to each of the participating WMCDs 102, 104d, 104e and 104f to enable time-of-arrival location determination operations.

In various embodiments of the invention, each of the WMCDs 102, 104d, 104e and 104f may operate autonomously such that none of the of the WMCDs 102, 104d, 104e and 4f act as a controller or coordinator for the entire group. Alternatively, the controller/coordinator task may be transferred from one or more of the WMCDs 102, 104d, 104e or 104f to another of the devices. In addition, a plurality of the WMCDs 102, 104d, 104e and/or 104f may have access to the network 106.

Figure 1E:
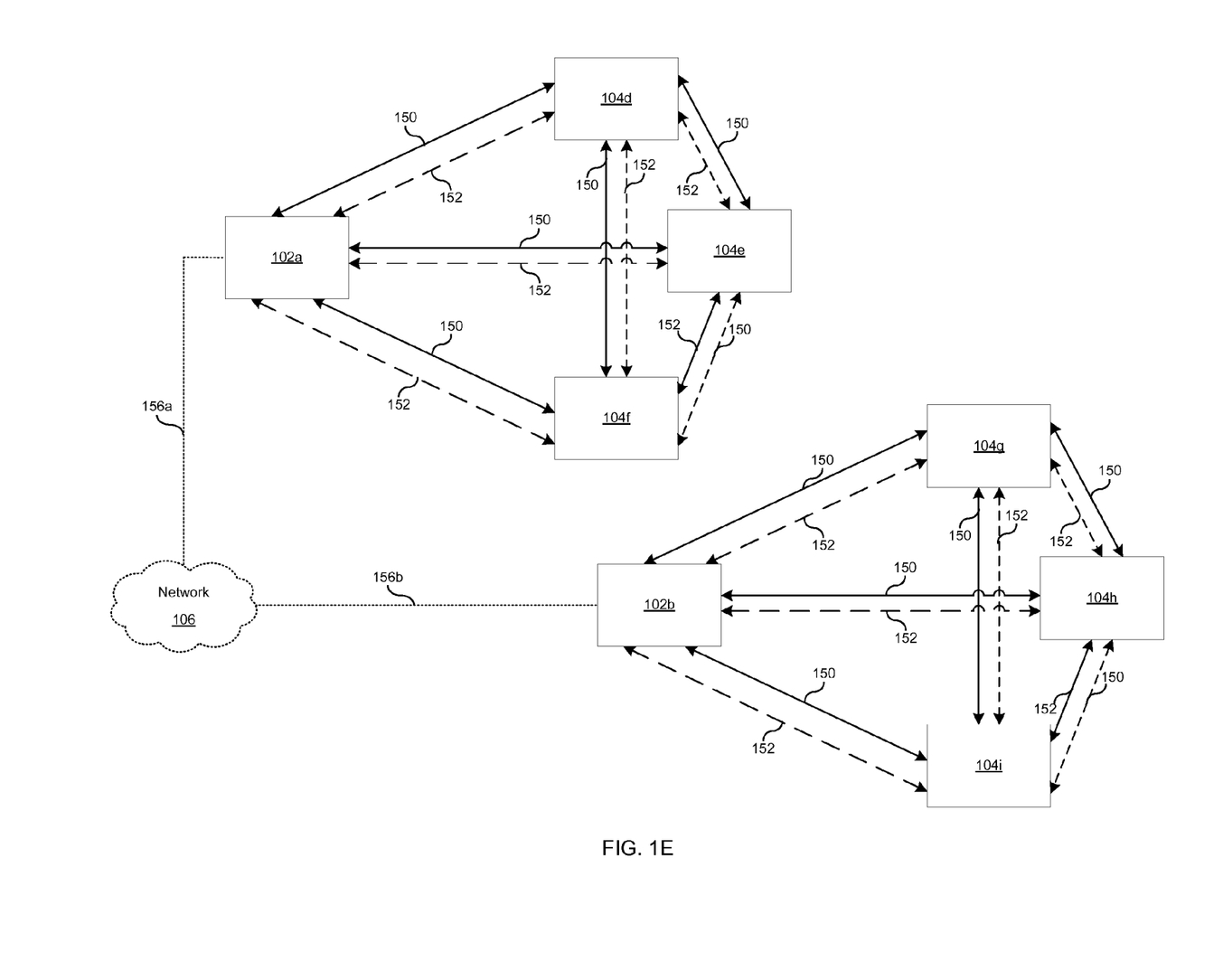
FIG. 1E is a block diagram that illustrates an exemplary system comprising a plurality of multimode wireless communication groups, in accordance with an embodiment of the invention.

FIG. 1E is a block diagram that illustrates an exemplary system comprising a plurality of multimode wireless communication groups, in accordance with an embodiment of the invention. Referring to FIG. 1E, there is shown two systems of four WMCDs 102a, 104d, 104e and 104f and 102b, 104g, 104h and 104i, a plurality of wireless links 150, a plurality of 60 GHz wireless links 152, line or wireless communications links 156a and 156b and a network 106.

The network 106 and wireless or line communications links 156a and 156b may be similar to or substantially the same as the network 106 and wireless or line communications link 154 described in FIG. 1B and FIG. 1C. The WMCDs 102a and 102b may be similar to and or substantially the same as the WMCD 102 described in FIGS. 1A, 1B, 1C and/or 1D. The WMCDs 104d, 104e, 104f, 104g, 104h and 104i may be similar to and/or substantially the same as the WMCD 104 described in FIGS. 1A and 1B and/or the WMCDs 104a, 104b and 104c described in FIG. 1C and/or the WMCDs 104d, 104e and 104f described in FIG. 1D. The 60 GHz wireless links 152 and lower frequency wireless links 150 may be similar and/or substantially the same as the 60 GHz wireless link 152 and lower frequency wireless link 150 described in FIGS. 1B, 1C and/or 1D.

In operation, the plurality of exemplary systems shown in FIG. 1E may be similar to the systems described in FIGS. 1A, 1B, 1C and/or 1D. However, in FIG. 1E, a system comprising the wireless multimedia devices 104d, 104e and 104f communicating with the WMCD 102a may communicate with a system comprising the WMCDs 104g, 104h and 104i communicating with WMCD 102b via the network 106 and wireless or line communication links 156a and 156b. For example, wireless communication devices 102a and 102b may exchange control information, configuration information, signaling information, protocol information, position information and/or frequency or channel utilization information regarding one or more of WMCDs 102a, 102b, 104d, 104e, 104f, 104g, 104h and 104i that may be operating within transmission and/or reception range of each other. Accordingly, frequency coordination and/or interference management among the plurality of systems may be enabled by such communication of information. In addition, data may be shared between the systems, such as audio/video files and/or other application or administrative data.

Figure 2:
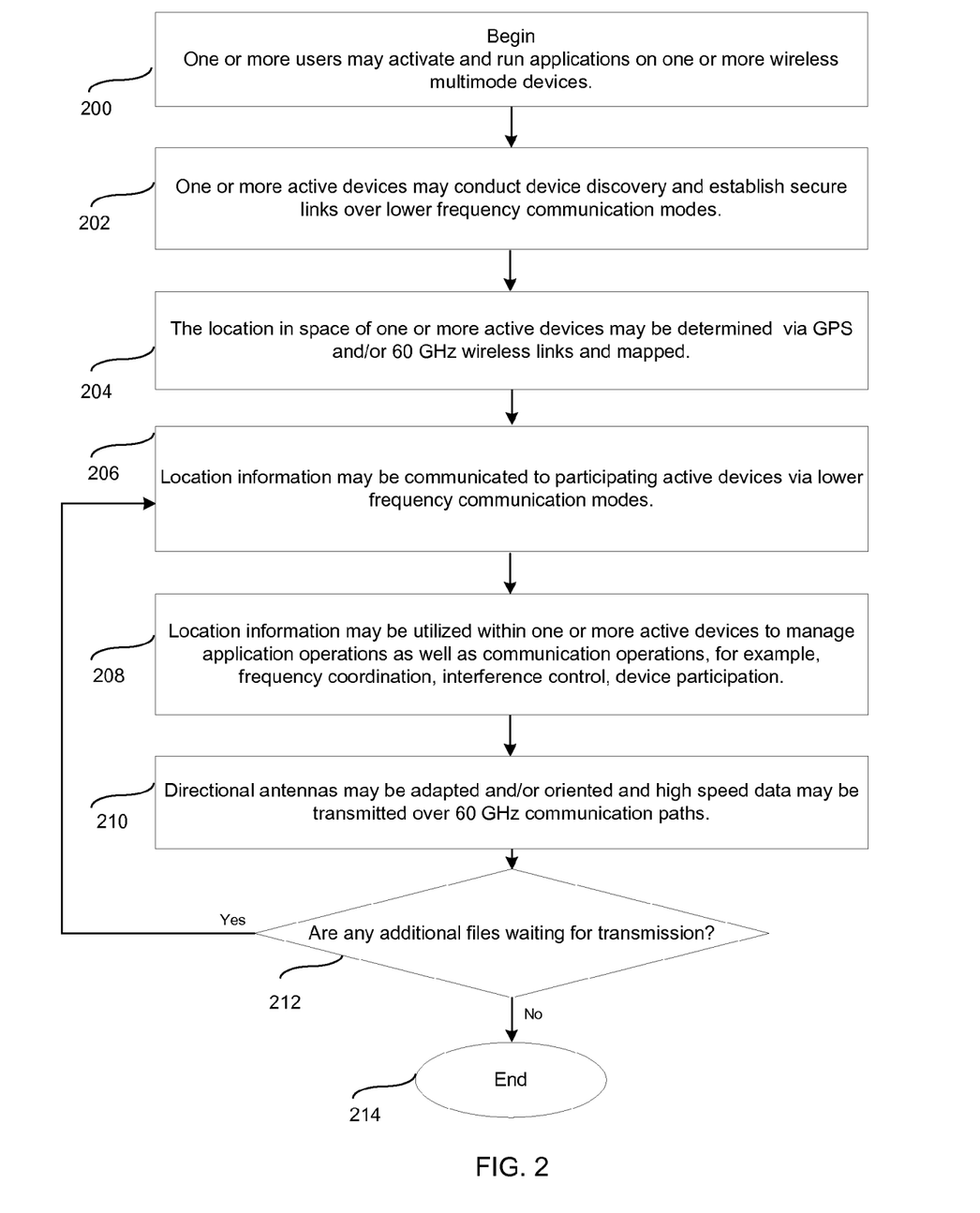
FIG. 2 is a flow chart that illustrates exemplary steps for communicating via a plurality of frequencies and wireless communication technologies, in accordance with an embodiment of the invention.

FIG. 2 is a flow chart that illustrates exemplary steps for communicating via a plurality of frequencies and wireless communication technologies, in accordance with an embodiment of the invention. Referring to FIG. 2, the process begins in step 200 wherein one or more users may activate one or more of the WMCDs 102, 102a, 102b, 104, 104a, 104b, 104c, 104d, 104e, 104f, 104g, 104h and/or 104i. Additionally, various applications may be run on the one or more active WMCDs. In step 202, lower frequency wireless links 150 may be utilized to conduct device discovery and/or communications operations for the active WMCDs within a local region. In this regard, the WPAN interface 110c and/or WLAN interface 110b may be utilized for example. In step 204, location determination information may be gathered via the 60 GHz wireless link 152 and/or GPS receiver 110d for example and positions of the one or more active WMCDs within the local region may be determined and mapped. In step 206, the mapped position data may be communicated via the lower frequency wireless links 150 to one or more of the active devices within the local region. In step 208, the mapped position information may be utilized for application operations, frequency assignments and/or interference management for example. In step 210, antennas allocated for 60 GHz transmissions may be adapted and/or oriented and high speed data may exchanged between active WMCDs. In step 212, if there are no further file transfers requested, the process may proceed to step 214. Step 214, is the end step. In step 212, if additional files need to be transferred, proceed to step 306.

In an embodiment of the invention, information may be communicated between two or more WMCDs 102, 102a, 102b, 104 and/or 104a through 104i, wherein spatial relationships between the two or more devices may vary. Accordingly, one or more of the WMCDs 102, 102a, 102b, 104 and 104a through 104i may comprise a 60 GHz band, wireless interface 110a that may handle location determination operations as well as communicating information between two or more WMCDs 102, 102a, 102b, 104 and 104a through 104i. In addition, one or more of the WMCDs 102, 102a, 102b, 104 and 104a through 104i may comprise one or more lower frequency band, wireless interfaces such as a WPAN interface 110c and/or a WLAN interface 110b that may handle coordination operations and/or transfer of data among the two or more WMCDs 102, 102a, 102b, 104 and 104a through 104i. Notwithstanding, one or more of the WMCDs 102, 102a, 102b, 104 and 104a through 104i may communicate via a line or wireless network to devices outside of a local region. In some embodiments of the invention, antennas on one or more of the WMCDs 102, 102a, 102b, 104 and 104a through 104i may be spatially oriented for directional transmission and/or reception. Moreover, the spatial orientation of the antennas may be dynamically modified, for example, the bore sight of a directional antenna may be swept across a specified angle for a specified operation. Furthermore, the antenna orientation may be dynamically modified according to varying spatial relationships among two or more of the WMCDs 102, 102a, 102b, 104 and 104a through 104i. In this regard, intelligent antennas, adaptive or steered antennas or antenna systems may be utilized. Furthermore, the WMCDs 102, 102a, 102b, 104 and 104a through 104i may utilize a position and/or time reference system, for example GPS via the GPS interface 110d or a terrestrial reference system to aid in location determination operations for example.

Certain embodiments of the invention may comprise a machine-readable storage having stored thereon, a computer program having at least one code section for 60 GHz location determination and coordination of WLAN/WPAN/GPS multimode communication devices, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels of integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for enabling wireless communication, the method comprising
   in a communication system comprising a plurality of wireless multimode communication devices (WMCDs), each of which comprises an integrated 60 GHz interface and one or more lower radio frequency band interfaces,
      determining via a 60 GHz interface of one of said plurality of WMCDs, a location of at least one other of said plurality of WMCDs; and
      coordinating communication between said one of said plurality of WMCDs and said at least one other of said plurality of WMCDs via said one or more lower radio frequency band interfaces.

2. The method according to claim 1, comprising coordinating communication between said one of said plurality of WMCDs and said at least one other of said plurality of WMCDs via said 60 GHz interface and/or via said one or more lower radio frequency band interfaces.

3. The method according to claim 1, comprising communicating between one or more of said plurality of WMCDS via said 60 GHz interface and one or more of directional, steered, adaptive and intelligent antennas or antenna systems.

4. The method according to claim 1, comprising handling said coordinating communications among said plurality of WMCDs via said lower radio frequency band interfaces via one or more of an 802.11 WLAN, a Bluetooth WPAN and/or a Wimedia UWB.

5. The method according to claim 1, comprising coordinating utilization of wireless transmission frequencies and physical interfaces for said communications among said plurality of WMCDs.

6. The method according to claim 1, comprising coordinating communications between said plurality of WMCD wherein a first portion of said plurality of WMCD is located in a first local region and a second portion of said plurality of WMCD is located in a second local region.

7. The method according to claim 1, comprising determining the location of one or more of said plurality of WMCDs based on measurements made via said 60 GHz interface and one or more of directional, steered, adaptive and intelligent antennas or antenna systems.

8. The method according to claim 1, comprising determining the location of one or more of said plurality of WMCDs based on global positioning system (GPS) information.

9. The method according to claim 1, comprising communicating location information to one or more of said plurality of WMCDs via said lower radio frequency band interfaces and one or more of an 802.11 WLAN, a Bluetooth WPAN and/or a Wimedia UWB.

10. A system for enabling wireless communication, the system comprising:
one or more circuits for use in a communication system comprising a plurality of wireless multimode communication devices (WMCDs), each of which comprises an integrated 60 GHz interface and one or more lower radio frequency band interfaces,
said one or more circuits in one of said plurality of WMCDs determines via its corresponding 60 GHz interface, a location of at least one other of said plurality of WMCDs; and
said one or more circuits in said one of said plurality of WMCDs coordinates communication between said one of said plurality of WMCDs and said at least one other of said plurality of WMCDs via said one or more lower radio frequency band interfaces.

11. The system according to claim 10, wherein said one or more circuits in said one of said plurality of WMCDs enables coordination of communication between said one of said plurality of WMCDs and said at least one other of said plurality of WMCDs via said 60 GHz interface and/or via said one or more lower radio frequency band interfaces.

12. The system according to claim 10, wherein said one or more circuits in said one of said plurality of WMCDs enables communication between one or more of said plurality of WMCDs via said 60 GHz interface and one or more of directional, steered, adaptive and intelligent antennas or antenna systems.

13. The system according to claim 10, wherein said one or more circuits in said one of said plurality of WMCDs enables handling said coordination of communications among said plurality of WMCDs via said lower radio frequency band interfaces via one or more of an 802.11 WLAN, a Bluetooth WPAN and/or a Wimedia UWB.

14. The system according to claim 10, wherein said one or more circuits in said one of said plurality of WMCDs enables coordination of wireless transmission frequencies utilization and physical interfaces for said communications among said plurality of WMCDs.

15. The system according to claim 10, wherein said one or more circuits in said one of said plurality of WMCDs enables coordination of communications between said plurality of WMCD wherein a first portion of said plurality of WMCD is located in a first local region and a second portion of said plurality of WMCDs is located in a second local region.

16. The system according to claim 10, wherein said one or more circuits in said one of said plurality of WMCDs enables determination of the location of one or more of said plurality of WMCDs based on measurements made via said 60 GHz interface and one or more of directional, steered, adaptive and intelligent antennas or antenna systems.

17. The system according to claim 10, wherein said one or more circuits in said one of said plurality of WMCDs enables determination of the location of one or more of said plurality of WMCDs based on global positioning system (GPS) information.

18. The system according to claim 10, wherein said one or more circuits in said one of said plurality of WMCDs enables communication of location information to one or more of said WMCDs via said lower radio frequency band interfaces and one or more of an 802.11 WLAN, a Bluetooth WPAN and/or a Wimedia UWB.

19. A machine-readable storage having stored thereon, a computer program having at least one code section for enabling wireless communication, the at least one code section being executable by a machine for causing the machine to perform steps comprising:
in a communication system comprising a plurality of wireless multimode communication devices (WMCDs), each of which comprises an integrated 60 GHz interface and one or more lower radio frequency band interfaces,
determining via a 60 GHz interface of one of said plurality of WMCDs, a location of at least one other of said plurality of WMCDs; and
coordinating communication between said one of said plurality of WMCDs and said at least one other of said plurality of WMCDs via said one or more lower radio frequency band interfaces.

20. The machine-readable storage according to claim 19, wherein said at least one code section comprises code that enables coordinating communication between said one of said plurality of WMCDs and said at least one other of said plurality of WMCDs via said 60 GHz interface and/or via said one or more lower radio frequency band interfaces.

21. The machine-readable storage according to claim 19, wherein said at least one code section comprises code that enables communicating between one or more of said plurality of WMCDs via said 60 GHz interface and one or more of directional, steered, adaptive and intelligent antennas or antenna systems.

22. The machine-readable storage according to claim 19, wherein said at least one code section comprises code that enables handling said coordinating communications comprising coordinating utilization of wireless transmission frequencies and physical interfaces among said plurality of WMCDs via said lower radio frequency band interfaces via one or more of an 802.11 WLAN, a Bluetooth WPAN and/or a Wimedia UWB.

23. The machine-readable storage according to claim 19, wherein said at least one code section comprises code that enables coordinating communications between said plurality of WMCD wherein a first portion of said plurality of WMCD is located in a first local region and a second portion of said plurality of WMCD is located in a second local region.

24. The machine-readable storage according to claim 19, wherein said at least one code section comprises code that enables determining the location of one or more of said plurality of WMCDs based on measurements made via said 60 GHz interface, a global positioning system (GPS) and one or more of directional, steered, adaptive and intelligent antennas or antenna systems.

25. The machine-readable storage according to claim 19, wherein said at least one code section comprises code that enables communicating location information to one or more of said WMCDs via said lower radio frequency band interfaces and one or more of an 802.11 WLAN, a Bluetooth WPAN and/or a Wimedia UWB.

* * * * *

UNITED STATES PATENT AND TRADEMARK OFFICE
CERTIFICATE OF CORRECTION

| | | |
|---|---|---|
| PATENT NO. | : 7,912,449 B2 | Page 1 of 1 |
| APPLICATION NO. | : 11/924814 | |
| DATED | : March 22, 2011 | |
| INVENTOR(S) | : Hansen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 674 days.

Signed and Sealed this
Ninth Day of August, 2011

David J. Kappos
*Director of the United States Patent and Trademark Office*